Patented Aug. 18, 1936

2,051,045

UNITED STATES PATENT OFFICE 2,051,045

VIOLANTHRONE DERIVATIVES

Fletcher Beach Holmes, Wilmington, Del., and Alexander John Wuertz and William Hiram Lycan, South Milwaukee, Wis., assignors to E. I. du Pont de Nemours & Company, Wilmington, Del., a corporation of Delaware No Drawing. Application August 22, 1933, Serial No. 686,264. Renewed February 1, 1936

9 Claims. (Cl. 260—61)

This invention relates to carbon compounds and more particularly to the preparation of derivatives of violanthrones. It especially appertains to the substances produced by the reaction or condensation of sulfonyl halides with violanthrones.

It is well known by those skilled in the art that compounds known as benzanthrones are produced when compounds of the anthraquinone series are condensed with glycerine (see United States of America Patents 818,992 of April 24, 1906 and 809,892 of January 9, 1906 to Bally and Isler and 786,085 of March 28, 1905 to Bally). When benzanthrones are fused with caustic alkali under appropriate conditions there are produced compounds known as violanthrones (see "Colour Index" 1099).

Compounds having this general structure are powerful vat dyes. Since their discovery a tremendous amount of research work has been expended upon them. This work has developed the fact that two positions of such a nucleus are more reactive than the others. It is the general belief that the Bz2,Bz2' positions are the ones showing this particular activity.

It has now been found that a new series of anthraquinone vat colors, dyes and intermediates may be produced by condensing (or reacting) sulfonyl halides with violanthrones having these active positions free (or unoccupied).

This invention had for an object the preparation of new chemical compounds. Other objects were the preparation of new carbon compounds in a very desirable physical form and in a high state of purity. Still further objects were to produce new violanthrone derivatives, new sulfonyl halide derivatives, new vat colors, new vat dyes, new intermediates, new vattable compounds of the anthraquinone series, new coloring matters, new dyes and to devise new chemical processes. A general advance and other objects which will appear hereinafter are also contemplated.

The foregoing objects and related ends are accomplished in a manner set out in the following description in which details of the best mode contemplated for carrying out the invention are disclosed. Specifically one method for accomplishing the aforementioned objects is to treat violanthrones not substituted in the Bz2,Bz2' positions (that is, having these particular positions free) with sulfonyl halides in the presence of aluminum chlorides until one molecular proportion of the sulfonyl halide has been condensed with one molecular proportion of the violanthrone.

The invention will be further understood by a consideration of the following detailed description and illustrative specific examples in which the quantities are given by weight.

Example I

Six hundred (600) parts of anhydrous antimony trichloride, are heated to 180° C. and to this molten mass there was added under good agitation 300 parts of anhydrous aluminum chloride. This addition resulted in a decrease in temperature to 100-120° C. Heat was then applied and the temperature raised to 150-155° C. where it was held until the melt was completely homogeneous. The melt was allowed to cool to 95-100° C. and 100 parts of finely pulverized violanthrone added over a period of 15-60 minutes. When the reaction was again homogeneous, and at the same temperature, 35-40 parts of benzene sulfonyl chloride were dropped slowly onto the surface of the melt over a period of 30-60 minutes. After a brief period of agitation, the temperature of the reaction mixture was raised to 140-180° C. and maintained within these limits for 2-6 hours. At the end of this time, condensation being complete, the entire reaction mass was drowned in cold solution of hydrochloric acid (containing 5-10% HCl). The resulting suspension was brought to a boil and subsequently filtered. Antimony and aluminum salts were removed from the residual cake by repeated washings with 2-5% hydrochloric acid solution in the hot and the acid finally removed by washing with hot water. The product thus obtained, when dry, was a dark violet powder, which yielded a blue violet coloration in sulfuric acid. It gave a reddish-blue hydrosulfite vat from which cotton was dyed in reddish-blue shades, which turn to almost a pure blue upon oxidization in air. The dyeings are fast to chlorine, washing and sunlight. The product was found to be suitable for printing when made into an appropriate paste.

Example II

A similar process was carried out in which corresponding molecular proportions of para-brom-sulfonyl-chloride replaced the benzene sulfonyl chloride of Example I. The new product thus obtained was a dark blue powder which yielded somewhat bluer sulfuric acid solution than the product of Example I.

Example III

A similar process was carried out in which corresponding molecular proportions of 2-nitro-toluene-4-sulfonyl-chloride replaced the benzene sulfonyl chloride in Example I. A new dyestuff which gave blue sulfuric acid solutions and which dyed cotton in blue shades, which turn red blue upon oxidation in air, from a green blue alkaline hydrosulfite vat, was obtained.

Example IV

A melt composed of 600 parts of anhydrous antimony trichloride and 300 parts of anhydrous aluminum chloride was prepared as described in Example I. To this melt, at 95–100° C. there was added 100 parts of violanthrone (dibenzanthrone) and subsequently, at a similar temperature, 60–70 parts of anthraquinone-2-sulfonyl-chloride were added over a period of 30–60 minutes. After agitating several minutes at this temperature, heat was applied and the reaction temperature raised to 150–180° C. It was maintained within these limits for 2–6 hours, after which time the condensation was complete. The reaction mass was then drowned in 5–10% hydrochloric acid solution and the product was obtained in a manner similar to that described in Example I. The new dyestuff thus obtained was a dark violet powder, the sulfuric acid solution of which is less reddish-blue than that of the product of Example I. It had somewhat greater strength upon dyeing but was very nearly of the same shade and brightness.

Example V

When condensation was effected between violanthrone and anthraquinone-1-sulfonyl-chloride, according to the process described in Example IV, a new dyestuff having properties similar to those of the dyestuff of Example IV, was produced.

Example VI

A dyestuff having properties similar to those of the dyestuff produced in Example IV was obtained when the process described in Example IV was carried out, utilizing violanthrone and 1-nitro-anthraquinone-6-sulfonyl chloride.

Example VII

A melt composed of 300 parts of anhydrous antimony trichloride and 150 parts of anhydrous aluminum chloride, was prepared in the manner previously described. To this melt, maintained at 95–100° C., there was added 50 parts of dibenzanthrone and at a similar temperature 20–25 parts of anthraquinone-2-6-disulfonyl chloride were added over a period of 30–60 minutes. After agitating a few minutes, the temperature was raised to 140–160° C. and held within these limits for 2–6 hours. The resulting condensation product was freed from the reaction mixture as described in Example I and there resulted a dark reddish-blue powder. It resembled very closely the product obtained by condensing violanthrone with anthraquinone-2-sulfonyl-chloride.

Example VIII

A product similar to that of Example VII was obtained when anthraquinone-2-7-disulfonyl-chloride replaced the anthraquinone-2-6-disulfonyl-chloride in the process described in that example.

Example IX

To a melt of essentially the same proportions of anhydrous aluminum chlorides as that described in Example VII, there was added 100 parts of violanthrone at 95–100° C. While holding the temperature within these limits 30 parts of methoxy-sulfonyl-chloride was added over a period of 15–45 minutes. After a few minutes agitation at this temperature heat was applied and the temperature was raised to 140–160° C. where it was held for 2–6 hours. It was then drowned in dilute hydrochloric acid solution (HCl) and the product isolated exactly as set out in the previous examples. The new dyestuff produced dissolved in sulfuric acid to produce blue solutions and dyed cotton in blue shades from an alkaline hydrosulfite vat.

In a manner equivalent to that described in the preceding examples, condensations of violanthrones with 1-chloro-anthraquinone-2-sulfonyl-chloride, 1-nitro-anthraquinone-6-sulfonyl-bromide, 1-amino-anthraquinone-2-sulfonyl-chloride, naphthalene-sulfonyl-chloride, chloro-naphthalene-sulfonyl-chloride, nitro-naphthalene-sulfonyl-chloride, ortho-chloro-benzene-sulfonyl-chloride, para-nitro-benzene-sulfonyl-chloride, meta-nitrobenzene-sulfonyl-chloride, butane-1-sulfonyl-chloride, methane-sulfonyl-chloride, and the like, may be carried out. There are obtained compounds, colors and/or dyes which exhibit properties related to those of the preceding examples and which dye cotton in hues ranging from reddish-blue to greenish-blue.

The catholicity of the invention is apparent from the preceding description and specific examples. As there shown it is in general applicable to violanthrones having the Bz2,Bz2' positions free. As has been shown acyclic and carbocyclic sulfonyl halides (for example, chlorides and bromides) are especially suitable for the reaction utilized in this invention. The invention is not limited to the employment of such compounds, however, because heterocyclic sulfonyl halides which have diverse atoms in the nucleus to which the sulfonyl halide group is attached may be satisfactorily utilized. Aromatic compounds, such as those of the benzene, naphthalene, anthracene and phenanthrene series are deserving of special mention. The condensed ring compounds of the naphthalene and anthraquinone series are especially desirable. The benzene-sulfonyl halides and the naphthalene-sulfonyl halides are aryl compounds which are quite advantageously used. The alkyl and alkoxy sulfonyl halides and the anthraquinone-sulfonyl halides are of special interest.

The amount of antimony trichloride or other metal halide used as an adjuvant in the aluminum chloride melt may be varied over a wide range. If desired the antimony chloride may be omitted entirely. If used it need not be of great purity. The addition of other metal chlorides, such as sodium and zinc chloride to the melt for the purpose of producing proper fluidity, melting point or other physical and/or chemical conditions may be made if found expedient.

The temperature limits set forth in the foregoing examples are capable of wide variation without harmful change in results. Ordinarily, the temperature range of 90° or 95° to 180° C. for the condensation is preferred. Temperatures outside this range may be used at the sacrifice of time and/or yield of product. The temperatures for producing homogeneity in the melt and for drowning the fusion are not especially significant and depend upon the convenience of the person carrying out the reaction.

Time limits are likewise elastic and no detriment to the product has been noted after prolonged heating in the reaction melt.

The proportions of the reactants may be widely varied without apparently affecting the results.

An excess of either reactant remains in the melt when the reaction is complete and may be removed from the final product by suitable means. The reactant present in the least molecular proportion is quantitatively consumed during the reaction. Any excess of violanthrone may be separated from the condensation product by virtue of a diverse solubility in such solvents as concentrated sulfuric acid, organic solvents and alkaline hydrosulfite solutions.

The exact change taking place in the violanthrone molecule during the treatment with the sulfonyl halide, is not known. It is believed that a condensation product in which the violanthrone nucleus is linked through its Bz-2 position to the sulfonyl halide with which it was reacted is produced. It is believed that the products produced are sulfones. However, it is not desired to limit the invention to any particular theory and the above explanation is given only for the purpose of aiding in understanding the invention.

Whenever compounds are produced containing a nitro group it is to be understood that these may be reduced to the corresponding amino compounds in which state they are rendered suitable for further condensation.

This invention, or discovery, has numerous advantages as will be apparent to those skilled in the art. As outstanding among these, there may be mentioned the production of a new series of vat dyes and vattable products. New and important colored compounds, coloring matters and intermediates which are very stable, are now made available for the art.

As many apparently widely different embodiments of this invention may be made without departing from the spirit and scope thereof, it is to be understood that we do not limit ourselves to the specific embodiments thereof except as defined by the appended claims.

We claim:

1. The process which comprises condensing a sulfonyl halide with a violanthrone whose Bz2,Bz2′ positions are unoccupied.

2. The products obtainable according to the process of claim 1 which are probably sulfones, which exist as bluish powders and which are soluble in concentrated sulfuric acid and in alkaline hydro-sulfite solutions.

3. The process of claim 1 when the treatment is carried out in the presence of a mixture of aluminum chloride and antimony chloride.

4. The product obtainable by condensing a member of the group consisting of benzene sulfonyl-chloride, para-brombenzene-sulfonyl chloride, 2-nitro-toluene-4-sulfonyl-chloride, anthraquinone-2-sulfonyl-chloride, anthraquinone-1-sulfonyl-chloride, 1-nitro-anthraquinone-6-sulfonyl-chloride, anthraquinone-2,6-di-sulfonyl-chloride, anthraquinone-2,7-di-sulfonyl-chloride, and methoxy-sulfonyl-chloride with a violanthrone whose Bz2,Bz2′ positions are unoccupied.

5. The process which comprises condensing a benzene sulfonyl halide with a violanthrone whose Bz2,Bz2′ positions are unoccupied.

6. The process which comprises condensing an anthraquinone sulfonyl halide with a violanthrone whose Bz2,Bz2′ positions are unoccupied.

7. The product which is obtainable by heating 600 parts of anhydrous antimony tri-chloride to 180° C., adding under good agitation 300 parts of anhydrous aluminum chloride, adjusting the temperature to 150°–155° C., homogenizing the melt, cooling the melt to 95°–100° C., adding 100 parts of finely pulverized violanthrone over a period of 15–60 minutes, homogenizing the melt at 95°–100° C., adding 35–40 parts of benzene sulfonyl chloride slowly to the surface of the melt over a period of 30–60 minutes raising the temperature to 140°–180° C. and maintaining it in that range for 2–6 hours, drowning the resultant in cold 5%–10% hydrochloric acid, boiling, filtering, removing antimony and aluminum salts by washing with 2%–5% hot hydrochloric acid and washing with hot water, which product, when dry is a dark violet powder giving a blue-violet coloration in sulfuric acid and a reddish-blue alkaline hydrosulfite vat.

8. The product which is obtainable by heating 600 parts of anhydrous antimony tri-chloride to 180° C., adding under good agitation 300 parts of anhydrous aluminum chloride, adjusting the temperature to 150°–155° C., homogenizing the melt, cooling the melt to 95°–100° C., adding 100 parts of finely pulverized violanthrone over a period of 15–60 minutes, homogenizing the melt at 95°–100° C., adding 60–70 parts of anthraquinone-2-sulfonyl chloride slowly to the surface of the melt over a period of 30–60 minutes, raising the temperature to 150°–180° C. and maintaining it in that range for 2–6 hours, drowning the resultant in cold 5%–10% hydrochloric acid, boiling, filtering, removing antimony and aluminum salts by washing with 2%–5% hot hydrochloric acid and washing with hot water, which product, when dry, is a dark violet powder giving a bluish color in sulfuric acid and which dyes cotton in reddish-blue shades from an alkaline hydrosulfite vat.

9. The product which is obtainable by heating 600 parts of anhydrous antimony tri-chloride to 180° C., adding under good agitation 300 parts of anhydrous aluminum chloride, adjusting the temperature to 150°–155° C., homogenizing the melt, cooling the melt to 95°–100° C., adding 100 parts of finely pulverized violanthrone over a period of 15–60 minutes, homogenizing the melt at 95°–100° C., adding 60–70 parts of anthraquinone-1-sulfonyl chloride slowing to the surface of the melt over a period of 30–60 minutes, raising the temperature to 150°–180° C. and maintaining it in that range for 2–6 hours, drowning the resultant in cold 5%–10% hydrochloric acid, boiling, filtering, removing antimony and aluminum salts by washing with 2%–5% hot hydrochloric acid and washing with hot water, which product, when dry, is a dark violet powder giving a bluish color in sulfuric acid and which dyes cotton in reddish-blue shades from an alkaline hydrosulfite vat.

FLETCHER BEACH HOLMES.
ALEXANDER JOHN WUERTZ.
WILLIAM HIRAM LYCAN.